(12) United States Patent
Kwilosz

(10) Patent No.: US 7,404,548 B2
(45) Date of Patent: Jul. 29, 2008

(54) DAMPENING CLIP ASSEMBLY

(75) Inventor: Mark J. Kwilosz, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 280 days.

(21) Appl. No.: 11/357,508

(22) Filed: Feb. 17, 2006

(65) Prior Publication Data

US 2007/0034769 A1    Feb. 15, 2007

Related U.S. Application Data

(60) Provisional application No. 60/706,976, filed on Aug. 10, 2005.

(51) Int. Cl.
*F16F 13/00* (2006.01)

(52) U.S. Cl. .................. 267/140.13; 267/136; 248/71; 248/74.2; 248/74.4

(58) Field of Classification Search .......... 267/140.13, 267/136; 248/71, 74.1, 74.2, 74.3, 74.4, 248/73, 62, 68.1; 14/22; 285/61; 180/89.2, 180/296; D8/309, 380
See application file for complete search history.

(56) References Cited

U.S. PATENT DOCUMENTS

| | | | | |
|---|---|---|---|---|
| 2,248,730 | A * | 7/1941 | Wood | 248/550 |
| 2,308,969 | A * | 1/1943 | Riesing | 248/613 |
| 4,011,397 | A * | 3/1977 | Bouche | 174/42 |
| 4,564,163 | A * | 1/1986 | Barnett | 248/71 |
| 4,666,109 | A * | 5/1987 | Fallon et al. | 248/50 |
| 4,682,752 | A * | 7/1987 | Pischzik | 248/550 |
| 4,729,355 | A * | 3/1988 | Barnes | 123/342 |
| 2002/0066835 | A1 | 6/2002 | Sentpali et al. | |
| 2005/0079756 | A1 | 4/2005 | Kawai et al. | |
| 2006/0226301 | A1 * | 10/2006 | Kwilosz et al. | 248/65 |

FOREIGN PATENT DOCUMENTS

| | | | | |
|---|---|---|---|---|
| DE | 4035434 | A1 * | 5/1991 | 248/62 |
| EP | 1521024 | | 4/2005 | |
| JP | 61-55422 | A * | 3/1986 | 188/280 |
| JP | 6-137466 | A * | 5/1994 | 248/74.1 |
| JP | 2001343089 | | 12/2001 | |

* cited by examiner

*Primary Examiner*—Robert A. Siconolfi
*Assistant Examiner*—Mariano Sy
(74) *Attorney, Agent, or Firm*—Mark W. Croll; Paul F. Donovan

(57) ABSTRACT

A dampening clip assembly may include a spring mount, a clip member, and a sealing member. The spring mount may include a base, a piston cylinder extending from the base and defining an interior cavity, a mounting surface having a passage formed therethrough, and a spring positioned between the base and the mounting surface. The clip member is secured to the spring mount and configured to retain a tube. The clip member includes a piston extending from a main body. The piston may be disposed within the interior cavity of the piston cylinder. The sealing member may be secured to a portion of the piston, and forms a fluid-tight seal between the piston cylinder and the piston.

23 Claims, 6 Drawing Sheets

DAMPENING CLIP ASSEMBLY

RELATED APPLICATIONS

This application relates to and claims priority benefits from U.S. Provisional Patent Application 60/706,976 entitled "Dampening Clip," filed Aug. 10, 2005, which is hereby incorporated by reference in its entirety.

FIELD OF THE INVENTION

Embodiments of the present invention generally relate to clip devices commonly found in automobile applications, but may also be used in various other applications, as well. Further, embodiments of the present invention particularly relate to a spring-biased dampening clip assembly.

BACKGROUND OF THE INVENTION

Various systems within an automobile, such as fuel pumps, braking systems, HVAC, and the like, produce vibrations during operation. Excessive vibrations during operation of the automobile may be annoying to an operator. Moreover, the vibrations may produce enough vibratory energy and force to damage components within the automobile. For example, excessive vibrations may produce sufficient resonance within the automobile to dislodge particular components from one another (e.g., rattling fasteners loose, and the like).

Single-piece molded leaf and helical type spring clips and two piece overmolded clips have been used within automobiles to connect various components together. Leaf-spring clips are used mainly to resist rattles between clips and the vehicle chassis. These clips, however, are susceptible to allowing rigid parts of clips to abut, grind, or otherwise encounter a part of the chassis whereby vibratory energy may be translated. When helical spring clips are subjected to a resonant frequency, these clips may actually vibrate to a greater degree than that initially caused by the component, such as a pump.

Thus, a need exists for a clip assembly that dampens vibratory energy caused by proximate components. Further, a need exists for a dampening clip assembly that effectively minimizes or negates any vibratory energy transmitted to the dampening clip assembly.

SUMMARY OF THE INVENTION

Certain embodiments of the present invention provide a dampening clip assembly configured to dampen vibrations within a structure, such as an automobile chassis. The dampening clip assembly may include a spring mount, a clip member, and a sealing member, such as, for example, an elastomeric O-ring. The spring mount may include a base having a fluid channel, a piston cylinder extending from the base and defining an interior cavity in fluid communication with the fluid channel, a mounting surface having a passage formed therethrough, and a spring positioned between the base and the mounting surface. Lateral wings, which may be configured to prop the base away from a structure (such as an automobile chassis) to which the dampening clip assembly secures, may be integrally formed with the base. The spring is configured to exert a resistive force into the mounting surface when force is exerted into the mounting surface, thereby compressing the spring.

The clip member is secured to the spring mount and configured to retain a tube. The clip member includes a piston extending from a main body, such that the piston passes through the passage formed through the mounting surface and is disposed within the interior cavity of the piston cylinder. The piston is configured to move through the interior cavity so that when the clip member is moved toward the base, the piston moves toward the base and forces fluid within the interior cavity through the fluid channel. The piston may include a post extending from the main body, and a stud at a distal end of the post. The post may include a channel that retains the sealing member. The clip member may also include a securing clip integrally connected to the main body through a hinge, wherein the clip member is configured to retain the tube between the securing clip and the main body.

The sealing member may be secured to a portion of the piston. As such, the sealing member forms a fluid-tight seal between the piston cylinder and the piston.

Figure 1:
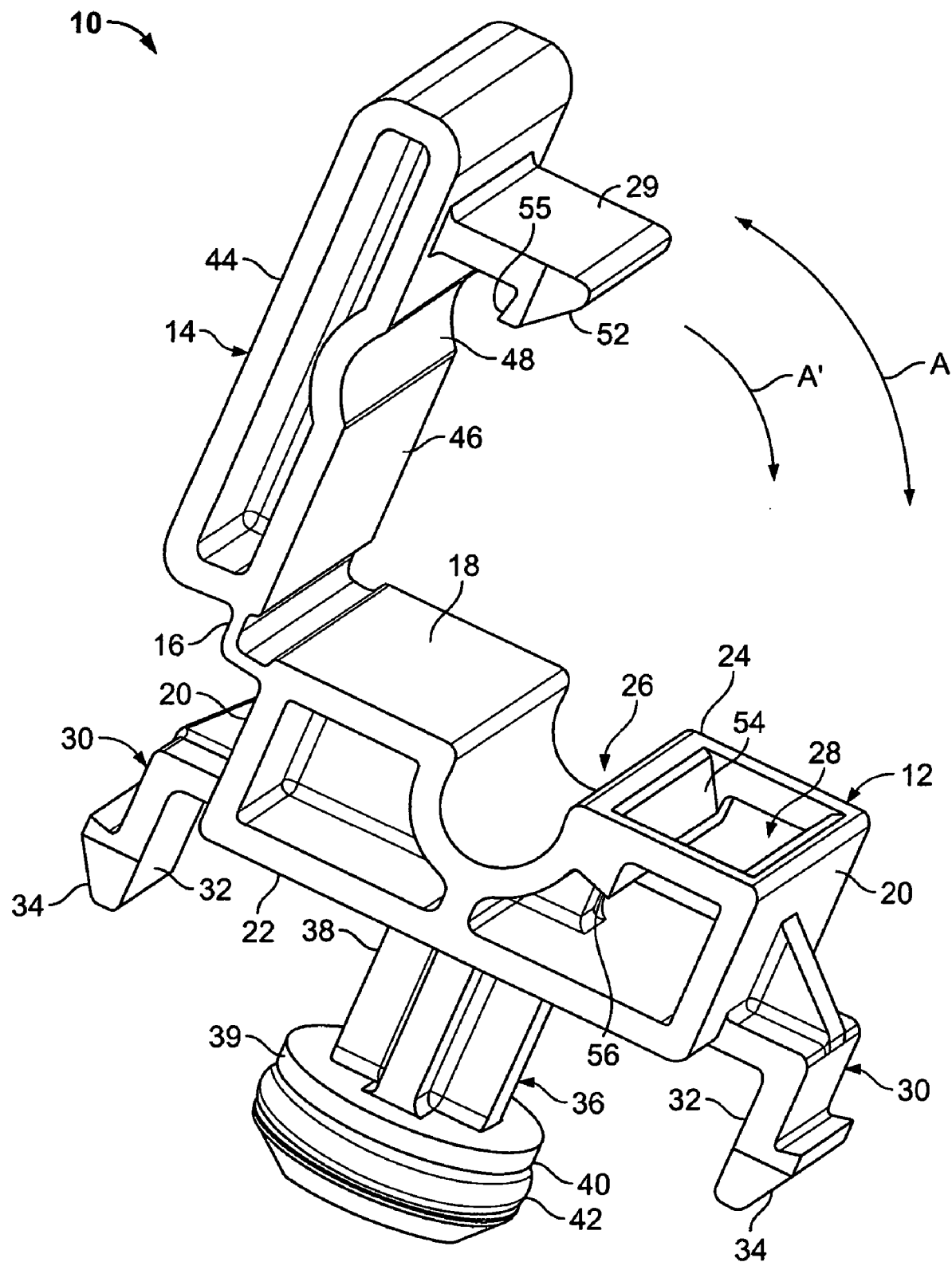
FIG. 1 illustrates an isometric lateral view of a clip member according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates an isometric lateral view of a clip member 10 according to an embodiment of the present invention. The clip member 10 includes a main body 12 integrally connected to a securing clip 14 through an integrally formed hinge 16. The main body 12 includes a central block 18 having lateral, lower, and upper walls 20, 22, and 24, respectively. A tubular channel 26 is formed through the upper wall 24 and is configured to receive a tube (not shown). The hinge 16 extends from an upper portion of one of the lateral walls 20 and allows the securing clip 14 to pivot between open and closed positions in the directions of arc A. A securing slot 28 is also formed through an end of the upper wall 24 that is opposite the hinge 16. The securing slot 28 is configured to receive and snapably, latchably, or otherwise removably retain a reciprocal structure, such as a tab 29, of the securing clip 14.

Spring mount retaining clips 30 extend downwardly from each lateral wall 20. The spring mounting retaining clip 30 include legs 32 having ramped ends 34 configured to snapably, latchably, or otherwise secure into reciprocal openings formed in a spring mount (shown, for example, in FIG. 2).

A piston 36 extends downwardly from the lower wall 22 of the main body 12. The piston 36 includes a post 38 that is integrally formed with a stud 39 having a recessed channel 40. As shown in FIG. 1, the radial cross-section of the stud 39 may be larger than the radial cross-section of the post 38. The recessed channel 40 is configured to retain a sealing member 42, such as a elastomeric, rubber, foam, or other such O-ring.

As mentioned above, the securing clip 14 is integrally connected to the main body 12 through the hinge 16. The securing clip 14 includes an engageable surface 44 integrally formed with a tube-retaining surface 46. A tubular channel 48 is formed through the tube-retaining surface 46 and is configured to cooperate with the tubular channel 26 of the main body 12 to secure a tube therebetween. The securing tab 29 includes a ramped end 52 that extends downwardly from the tube-retaining surface 46 and is distally located from the hinge 16. The securing tab 29 is configured to snapably secure into the securing slot 28 of the main body 12.

In order to secure a tube within the clip member 10, the tube is positioned within the tubular channel 26 of the main body 12. The tubular channel 26 may be configured to snapably engage the tube. The securing clip 14 is then pivoted into a locking position in the direction of arc A'. During this motion, the ramped end 52 of the tab 29 enters the securing slot 28 and passes over an edge 54 within the securing slot 28. Once the ramped end 52 of the tab 29 passes over the edge 54, the tab 50 snapably secures into the securing slot 28 by way of a ledge 55 of the tab 29 abutting against a ledge 56 within the securing slot 28. Thus, the clip member 10 may retain and isolate a tube on or within an automobile.

Figure 2:
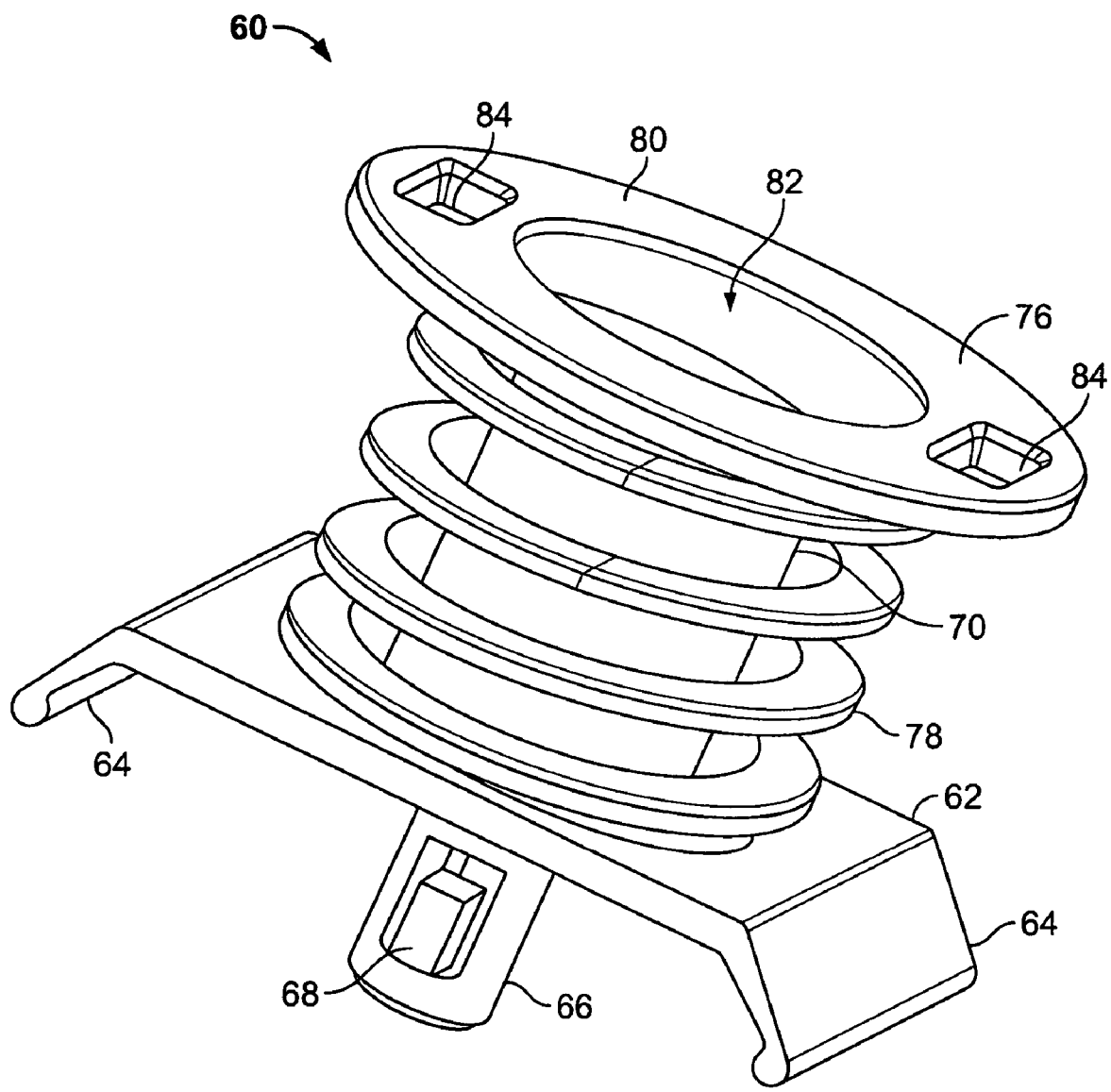
FIG. 2 illustrates an isometric lateral view of a spring mount according to an embodiment of the present invention.
Figure 3:
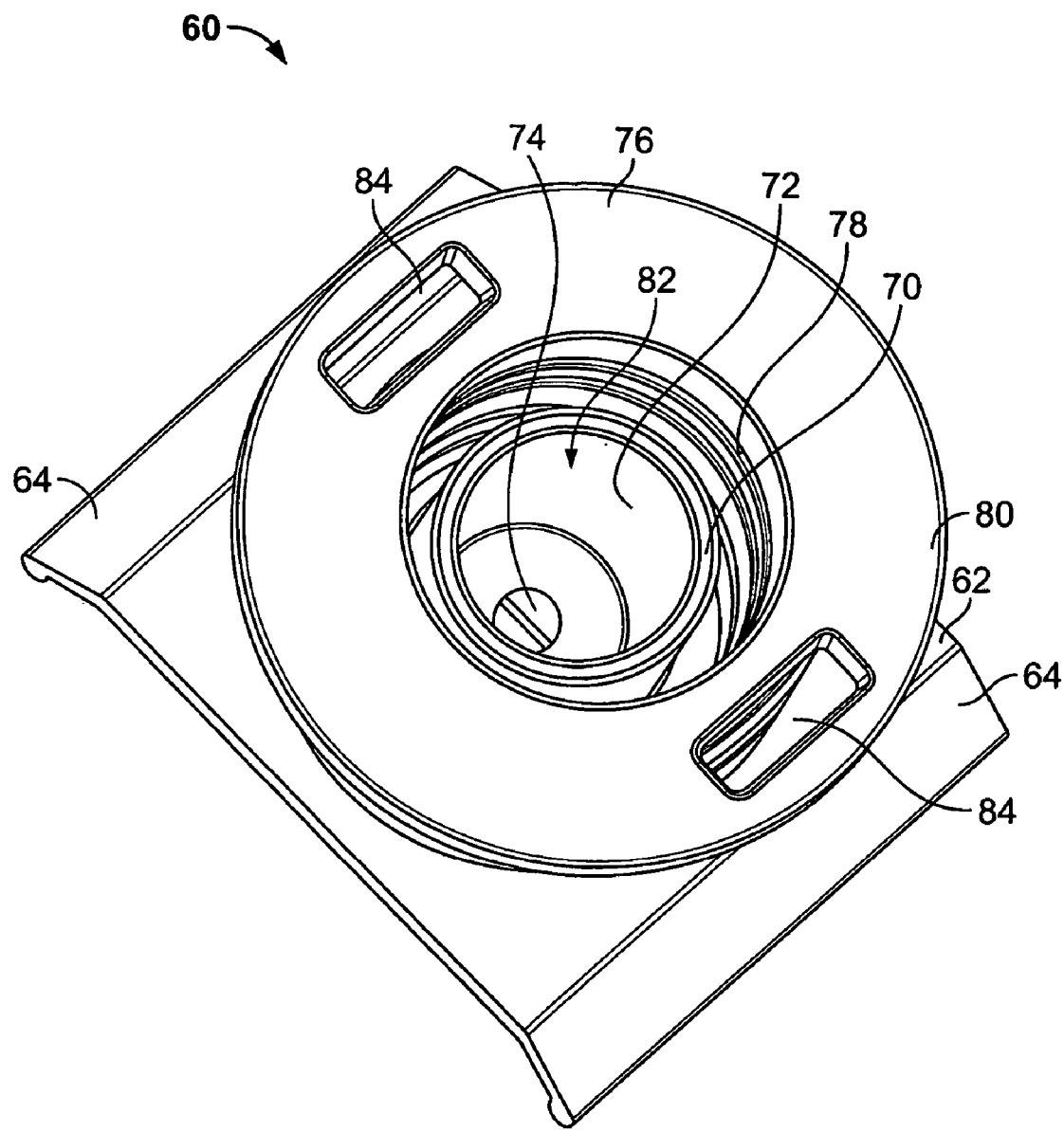
FIG. 3 illustrates an isometric top view of a spring mount according to an embodiment of the present invention.

FIGS. 2 and 3 illustrate an isometric lateral view and an isometric top view, respectively, of a spring mount 60 according to an embodiment of the present invention. The spring mount 60 includes a base 62 integrally formed with downwardly-angled wings 64 at either lateral side. A securing post 66 extends downwardly from the base 62 and includes barbs 68 configured to snapably secure the post 66, and therefore the spring mount 60, into a structure, such as an automobile chassis.

A cylinder 70 extends upwardly from the base 62. The cylinder 70 defines a piston cavity 72. A channel 74 extends through the base 62 into the piston cavity 72, thereby allowing fluid communication (such as air) from the piston cavity 72 through the base 62.

An annular mounting member or surface 76 is integrally connected to an upper surface of the base 62 through a coiled spring 78. As shown in FIG. 3, in particular, the annular mounting member 76 is concentrically positioned around the cylinder 70. The annular mounting member 76 includes a mounting ring 80 defining a central passage 82. Clip slots 84 are formed through the mounting ring 80 and are configured to receive and retain the spring mounting clips 30 of the clip member 10 (shown in FIG. 1).

Figure 4:
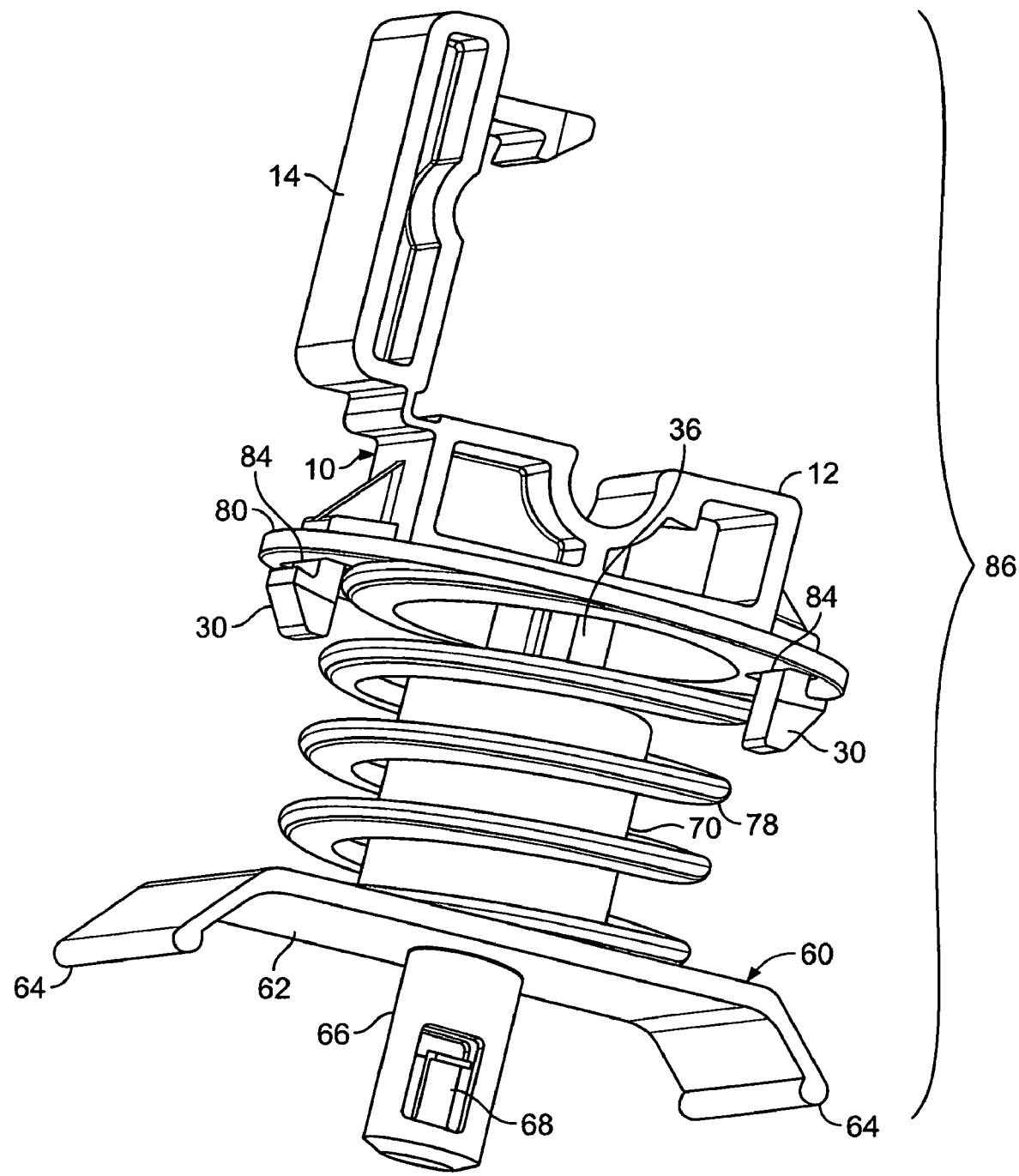
FIG. 4 illustrates an isometric lateral view of a dampening clip assembly according to an embodiment of the present invention.

FIG. 4 illustrates an isometric lateral view of a dampening clip assembly 86 according to an embodiment of the present invention. The dampening clip assembly 86 includes the clip member 10 secured to the spring mount 60. The spring mounting clips 30 are snapably secured into the clip slots 84 of the annular mounting member 76, thereby securing the clip member 10 to the spring mount 60. Additionally, the piston 36 is positioned within the piston cavity 72 (shown in FIG. 3, for example) such that the sealing member 42 (shown in FIG. 1), which radially extends from the stud 39 (shown in FIG. 1), sealingly engages an inner surface of the cylinder 70 (shown in FIG. 3, for example). The sealing engagement between the sealing member 42 and the cylinder 70 ensures that fluid may only be pushed downwardly through the channel 74 (shown in FIG. 3) formed through the base 62 instead of escaping upwardly past the sealing member 42 and the stud 39.

While the clip member 10 and the spring mount 60 are shown and described as separate and distinct components, the clip member 10 may alternatively be integrally formed with the spring mount 60. For example, the clip member 10 and the spring mount may be integrally molded as a single unit.

Figure 5:
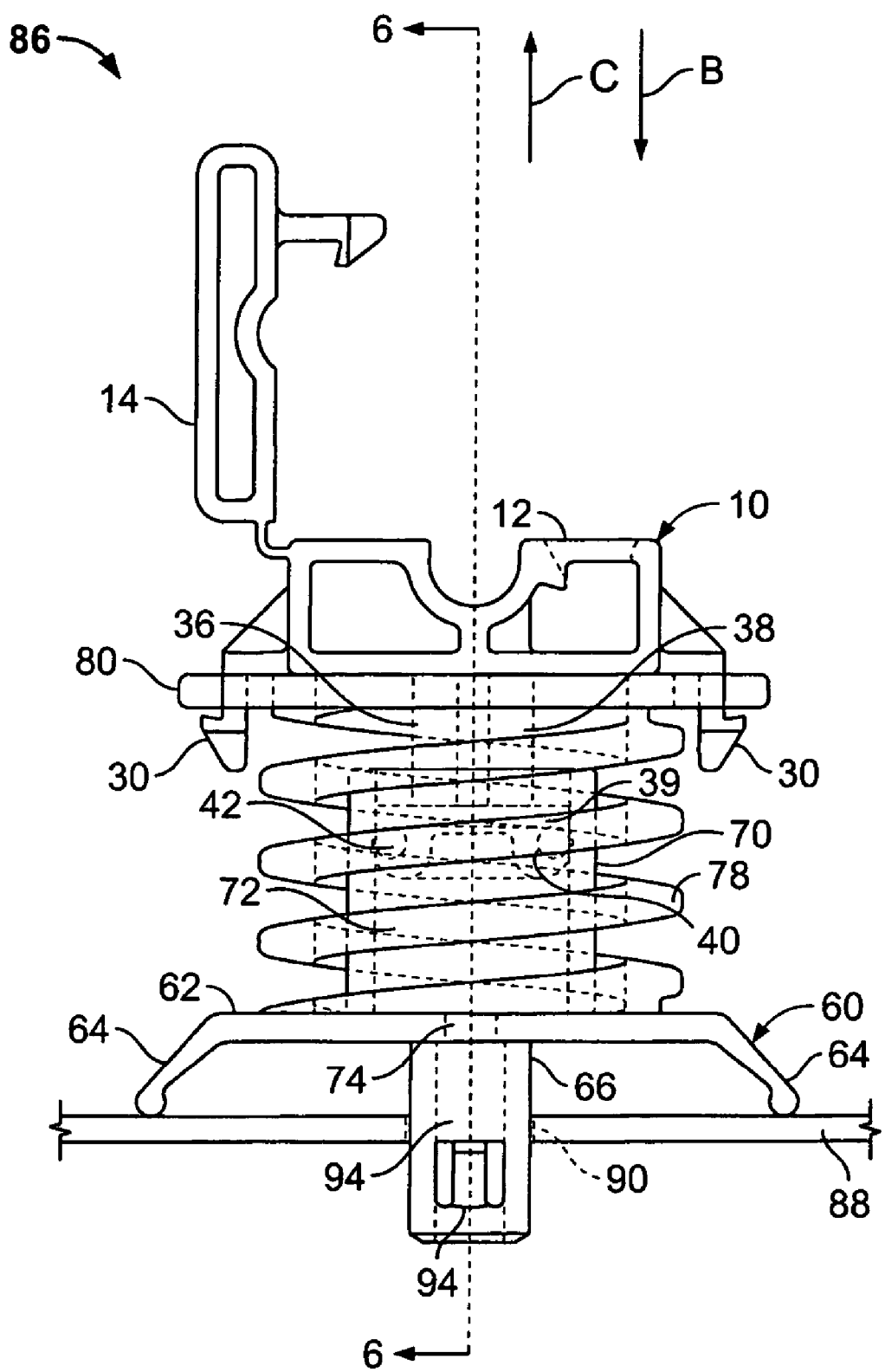
FIG. 5 illustrates a lateral elevation view of a dampening clip assembly according to an embodiment of the present invention.
Figure 6:
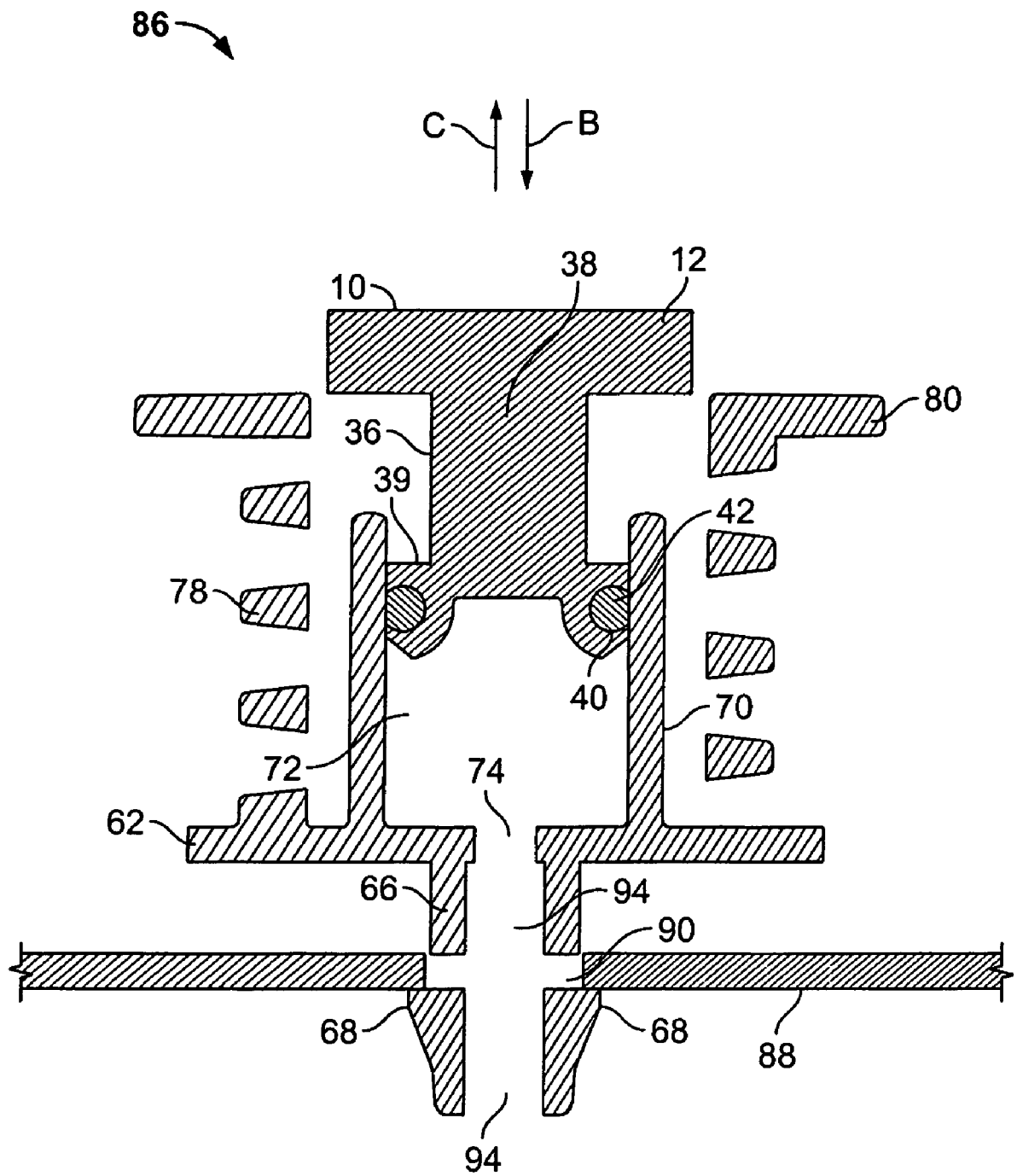
FIG. 6 illustrates a cross-sectional view of a dampening clip assembly through line 6-6 of FIG. 5 according to an embodiment of the present invention.

FIG. 5 illustrates a lateral elevation view of the dampening clip assembly 86, while FIG. 6 illustrates a cross-sectional view of the dampening clip assembly 86 through line 6-6 of FIG. 5. Referring to FIGS. 5 and 6, the dampening clip 86 may be secured to a structure 88, such as an automobile chassis, through the securing post 66 securing into a reciprocal opening 90 formed through the structure 88. The barbs 68 of the securing post 66 securely retain the spring mount 60, and therefore the dampening clip assembly 86 to the structure 88. The wings 64 of the base 62 prop the base 62 up over the structure 88 so that the base 62 does not contact the structure 88. Thus, there is a small amount of surface area over which vibratory energy may be translated from the dampening clip assembly 86 to the structure 88, or vice versa.

The piston 36 is positioned within the piston cavity 72 defined by the cylinder 70 such that the stud 39 and the sealing member 42 sealingly engage an inner surface of the cylinder 70. Fluid, such as air, underneath the piston 36 within the piston cavity 72 may pass from the piston cavity 72 through the fluid channel 74 formed through the base 62 of the spring mount 60, and out of the dampening clip assembly 86 through passages 94 formed through securing post 66.

When a force, such as vibratory energy, is exerted into the dampening clip assembly 86 in the direction of arrow B, the coiled spring 78 may compress and move in the same direction, while at the same time exerting a resistive force in the opposite direction. The sealing member 42 also creates a resistive force as a result of friction or engagement with the interior wall of the cylinder 70. Fluid, such as air, with the piston cavity 72 may be forced downwardly by the corresponding movement of the stud 39 and sealing member 42 through the piston cavity 72. Because the sealing member 42 forms a seal with the interior wall of the cylinder 70, fluid is not able to escape past the piston in the direction of arrow C. Instead, fluid is forced downwardly in the direction of arrow B as the sealing member 42 and the stud 39 move downwardly in the same direction. That is, as the mounting ring 80 and the clip member 10 are moved downwardly in the direction of arrow B, the piston 36 forces fluid within the piston cavity 72 through the channel 74 of the base 62, and out of the dampening clip assembly 86 through the passages 94 formed through the securing post 66. The resistive force exerted by the coiled spring 78 acts to prevent the clip member 10 from abutting the base 62 and/or the structure 88.

When the energy is no longer applied to the dampening clip assembly 86, the energy stored in the compressed coiled spring 78 is released, and the spring extends back to its at-rest position, thereby pushing the mounting ring 80 and the clip member 10 upwardly in the direction of arrow C. As such, fluid may be drawn back into the piston cavity 72 as the stud 39 and the sealing member 42 retreat upwardly in the direction of arrow C.

The dampening clip assembly 86 may be tuned to a frequency range of vibrations caused by a component, such as a pump. The size (e.g., length and diameter) and shape of the dampening clip assembly 86 may be varied to dampen forces in the frequency range. The dampening clip assembly 86 acts to slow down vibrations through the motion of the coiled spring 78. That is, the coiled spring 78 resists the downward motion of a force exerted into the dampening clip assembly 86. The coiled spring 78, as discussed above, ensures that the clip member 10, and therefore a tube within the clip member 10, returns to its equilibrium position after energy exerted into the dampening clip assembly 86 diminishes.

Thus, embodiments of the present invention provide a clip assembly that dampens vibratory energy caused by proximate components. Further, embodiments of the present invention provide a dampening clip assembly that effectively minimizes or negates any vibratory energy transmitted to the dampening clip assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A dampening clip assembly comprising:
   a spring mount comprising: (i) a base; (ii) a piston cylinder extending from said base and defining an interior cavity; (iii) a mounting surface having a passage formed therethrough; and (iv) a spring positioned between said base and said mounting surface;
   a clip member secured to said spring mount and configured to retain a tube, said clip member comprising a piston extending from a main body, said piston disposed within said interior cavity of said piston cylinder; and
   a sealing member secured to a portion of said piston, said sealing member forming a fluid-tight seal between said piston cylinder and said piston,
   wherein said spring mount further comprises a securing post extending from an opposite side of said base of said piston cylinder, said securing post including at least one protuberance configured to secure said spring mount to a structure.

2. The dampening clip assembly of claim 1, wherein said spring is configured to exert a resistive force when compressed in order to dampen vibrations.

3. The dampening clip assembly of claim 1, wherein said base further comprises a fluid channel in fluid communication with said interior cavity.

4. The dampening clip assembly of claim 3, wherein said piston is configured to move through said interior cavity so that when said clip member is moved toward said base, said piston moves toward said base and forces fluid within said interior cavity through said fluid channel.

5. The dampening clip assembly of claim 1, wherein said mounting surface is an annular ring having at least one slot formed through, and wherein said clip assembly further comprises at least one mounting clip that snapably secures into said at least one slot.

6. The dampening clip assembly of claim 1, wherein said clip member further comprises a securing clip integrally connected to said main body through a hinge, wherein said clip member is configured to retain the tube between said securing clip and said main body.

7. The dampening clip assembly of claim 1, wherein said piston comprises a post extending from said main body, and a stud at a distal end of said post, said post comprising a channel that retains said sealing member.

8. The dampening clip assembly of claim 1, wherein said sealing member is an elastomeric O-ring.

9. The dampening clip assembly of claim 1, wherein said spring mount further comprises lateral wings integrally formed with said base, said lateral wings configured to prop said base away from a structure to which the dampening clip assembly secures.

10. The dampening clip assembly of claim 1, wherein said mounting surface and said spring are concentrically positioned around said piston cylinder.

11. A dampening clip assembly comprising:
    a spring mount comprising: (i) a base having a fluid channel; (ii) a piston cylinder extending from said base and defining an interior cavity in fluid communication with said fluid channel; (iii) a mounting surface having a passage formed therethrough; and (iv) a spring positioned between said base and said mounting surface, said spring configured to exert a resistive force into said mounting surface when force is exerted into said mounting surface, thereby compressing said spring;
    a clip member secured to said spring mount and configured to retain a tube, said clip member comprising a piston extending from a main body, said piston passing through said passage and disposed within said interior cavity of said piston cylinder, said piston being configured to move though said interior cavity so that when said clip member is moved toward said base, said piston moves toward said base and forces fluid within said interior cavity through said fluid channel; and
    a sealing member secured to a portion of said piston, said sealing member forming a fluid-tight seal between said piston cylinder and said piston.

12. The dampening clip assembly of claim 11, wherein said mounting surface is an annular ring having at least one slot formed though, and wherein said clip assembly further comprises at least one mounting clip that snapably secures into said at least one slot.

13. The dampening clip assembly of claim 11, wherein said clip member further comprises a securing clip integrally connected to said main body through a hinge, wherein said clip member is configured to retain the tube between said securing clip and said main body.

14. The dampening clip assembly of claim 11, wherein said piston comprises a post extending from said main body, and a stud at a distal end of said post, said post comprising a channel that retains said sealing member.

15. The dampening clip assembly of claim 11, wherein said sealing member is an elastomeric O-ring.

16. The dampening clip assembly of claim 11, wherein said spring mount further comprises a securing post extending from an opposite side of said base as said piston cylinder, said securing post comprising at least protuberance configured to secure said spring mount to a structure.

17. The dampening clip assembly of claim 11, wherein said spring mount further comprises lateral wings integrally formed with said base, said lateral wings configured to prop said base away from a structure to which the dampening clip assembly secures.

18. A dampening clip assembly configured to dampen vibrations within an automobile chassis, the dampening clip assembly comprising:

a spring mount comprising: (i) a base; (ii) a mounting surface; and (iii) a spring positioned between said base and said mounting surface; and a clip member secured to said spring mount and configured to retain a tube, said spring configured to exert a resistive force into said mounting surface when force is exerted into said mounting surface, thereby compressing said spring, wherein said spring mount further comprises a piston cylinder extending from said base and defining an interior cavity, said base having a fluid channel in fluid communication with said interior cavity, and wherein said clip member further comprises a piston extending from a main body, said piston disposed within said interior cavity of said piston cylinder, and said piston being configured to move though said interior cavity so that when said clip member is moved toward said base, said piston moves toward said base and forces fluid within said interior cavity through said fluid channel.

19. The dampening clip assembly of claim 18, further comprising a sealing member secured to a portion of said piston, said sealing member forming a fluid-tight seal between said piston cylinder and said piston.

20. The dampening clip assembly of claim 19, wherein said piston comprises a post extending from said main body, and a stud at a distal end of said post, said post comprising a channel that retains said sealing member.

21. The dampening clip assembly of claim 19, wherein said sealing member is an elastomeric O-ring.

22. The dampening clip assembly of claim 18, wherein said clip member further comprises a securing clip integrally connected to said main body through a hinge, wherein said clip member is configured to retain the tube between said securing clip and said main body.

23. A dampening clip assembly configured to dampen vibrations within an automobile chassis, the dampening clip assembly comprising:

a spring mount comprising: (i) a base; (ii) a mounting surface; and (iii) a spring positioned between said base and said mounting surface; and a clip member secured to said spring mount and configured to retain a tube, said spring configured to exert a resistive force into said mounting surface when force is exerted into said mounting surface, thereby compressing said spring, wherein said spring mount further comprises lateral wings integrally formed with said base, said lateral wings configured to prop said base away from a structure to which the dampening clip assembly secures.

* * * * *